Figure 1:
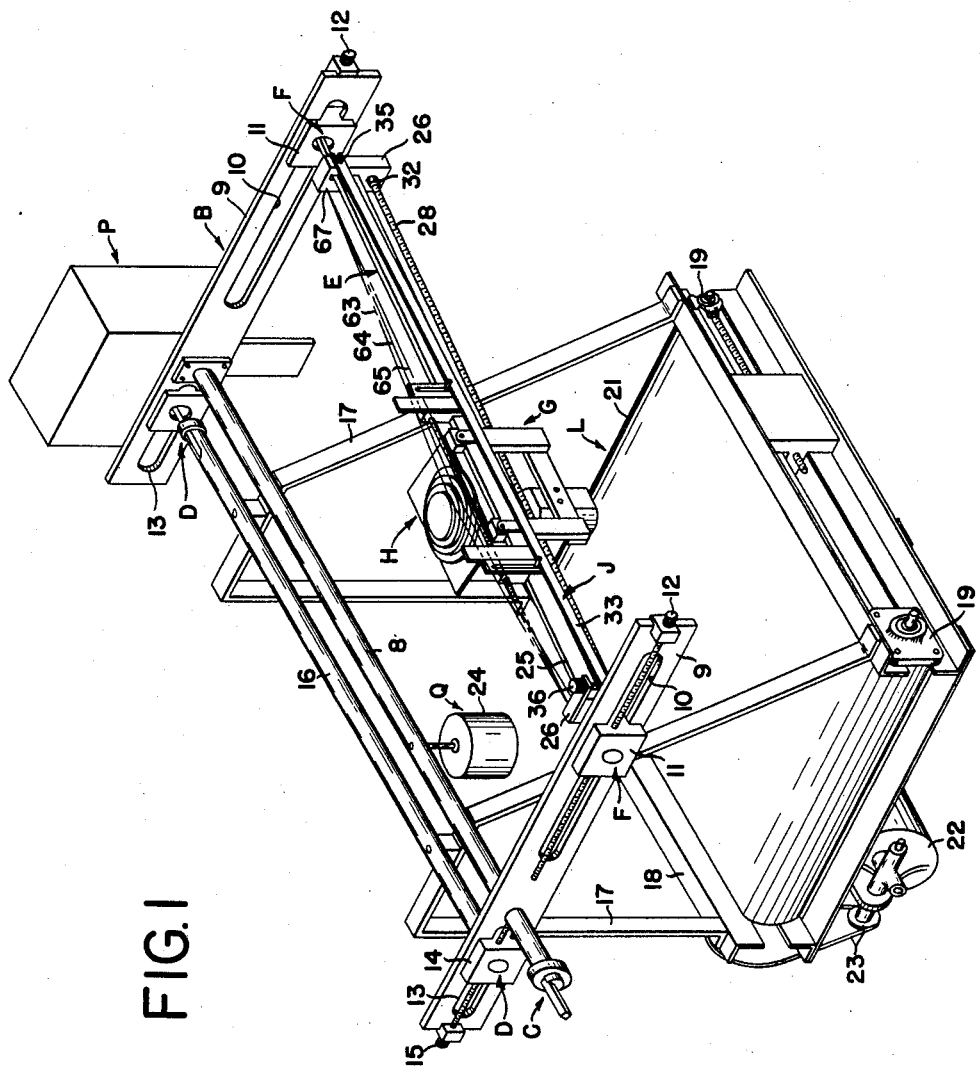

Feb. 16, 1960 C. G. JOHN 2,925,261
AUTOMATIC CONVEYOR WEIGHER
Filed Feb. 11, 1958 8 Sheets-Sheet 1

INVENTOR
CHAUCER G. JOHN
BY
ATTORNEY

Feb. 16, 1960 C. G. JOHN 2,925,261
AUTOMATIC CONVEYOR WEIGHER
Filed Feb. 11, 1958 8 Sheets-Sheet 2

INVENTOR
CHAUCER G. JOHN
BY
ATTORNEY

Feb. 16, 1960
C. G. JOHN
2,925,261
AUTOMATIC CONVEYOR WEIGHER
Filed Feb. 11, 1958
8 Sheets-Sheet 3
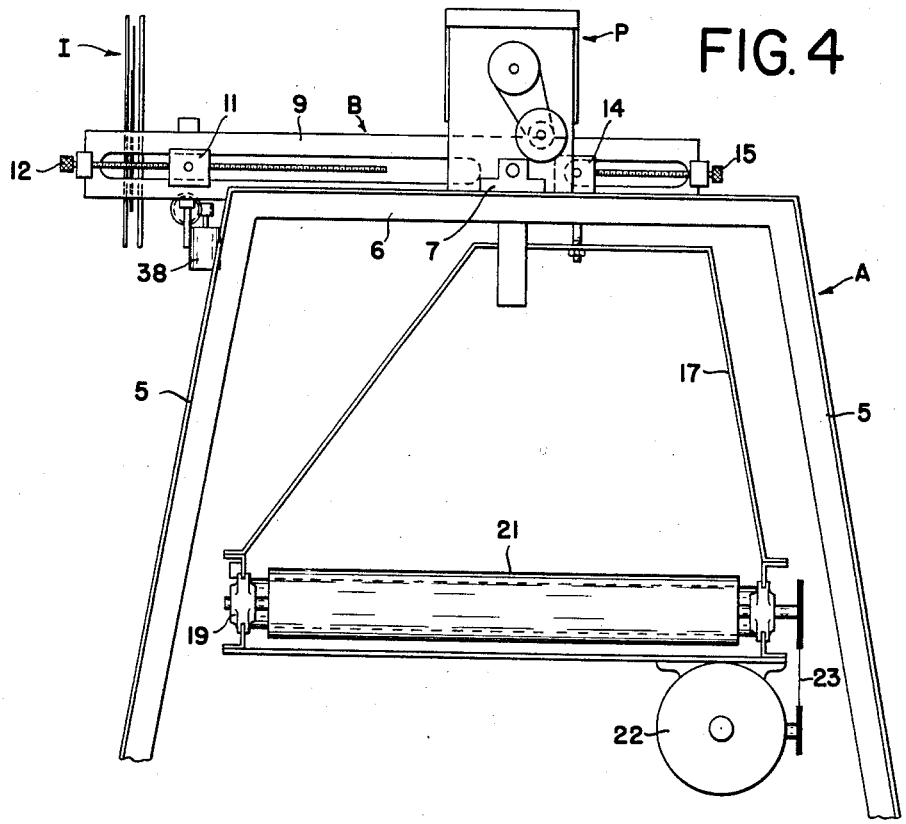
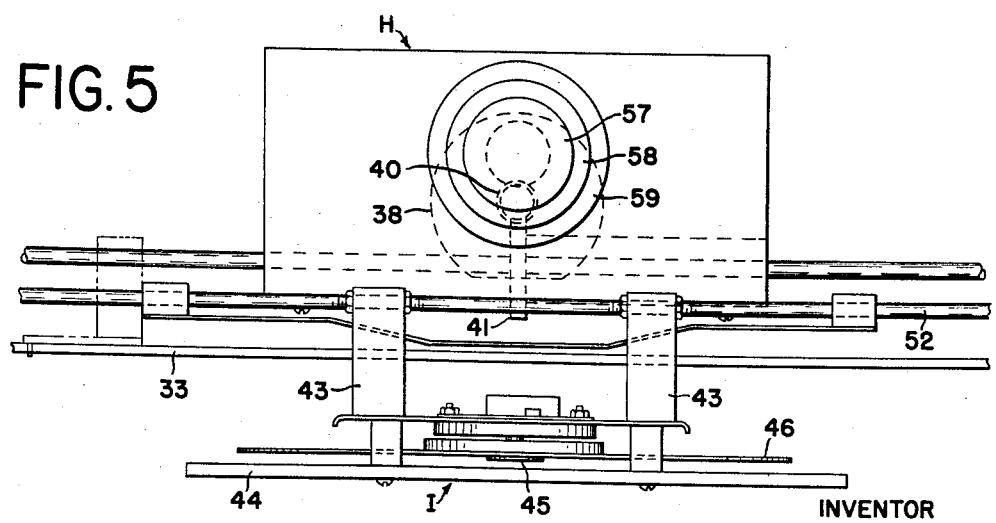
INVENTOR
CHAUCER G. JOHN
BY
ATTORNEY

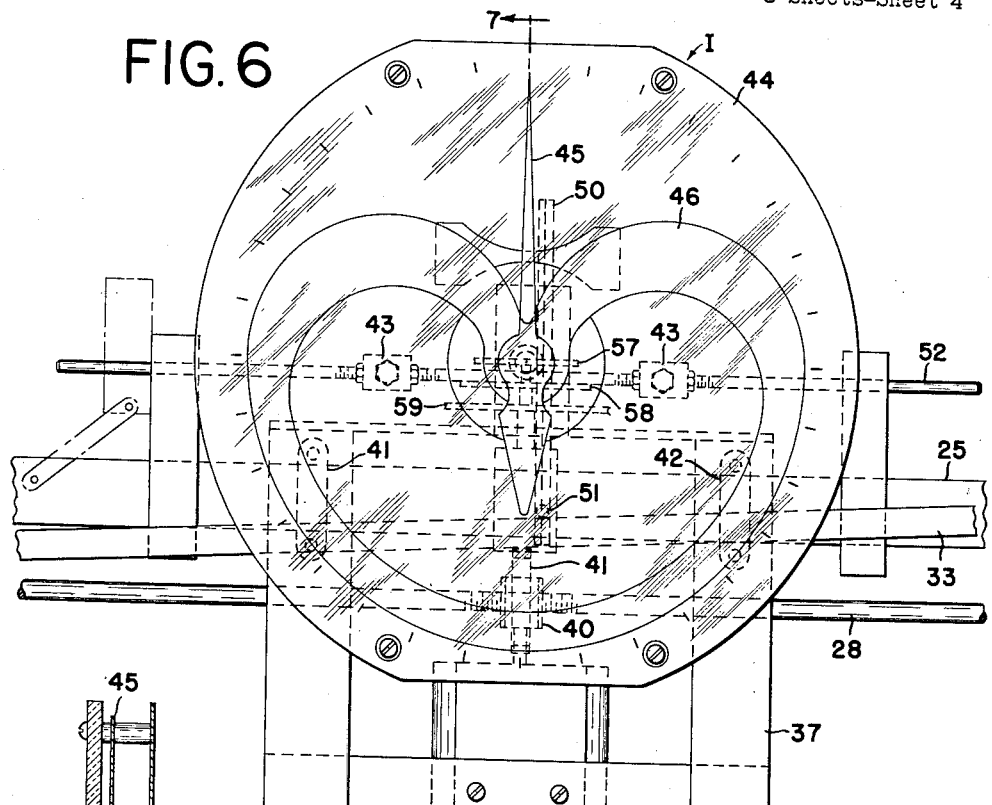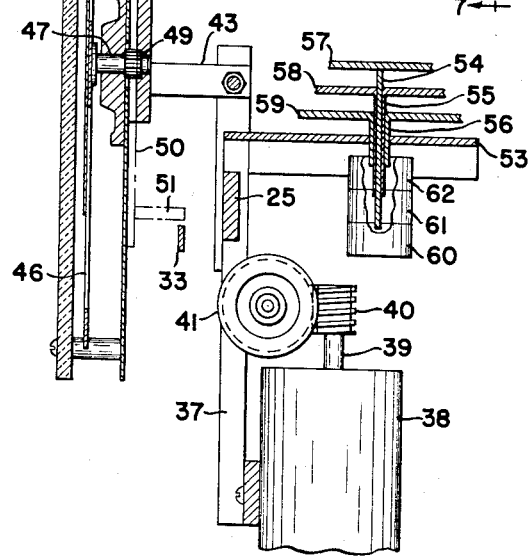

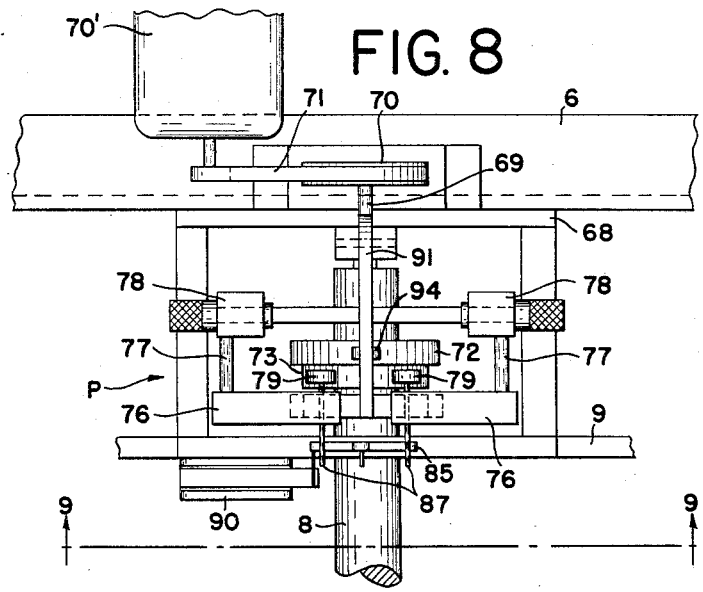
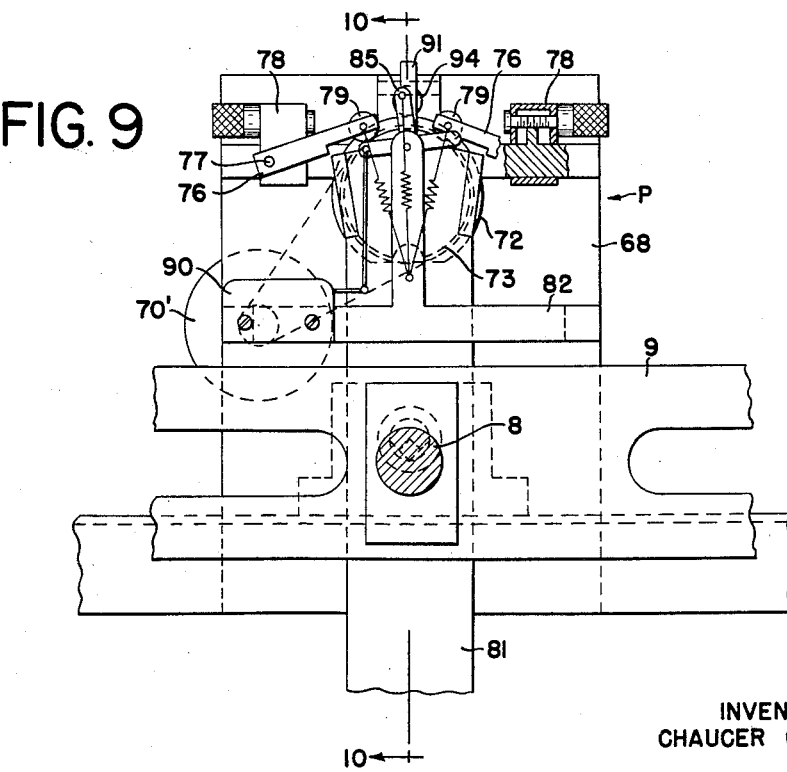

Feb. 16, 1960 C. G. JOHN 2,925,261
AUTOMATIC CONVEYOR WEIGHER
Filed Feb. 11, 1958 8 Sheets-Sheet 6

INVENTOR
CHAUCER G. JOHN

BY
ATTORNEY

Feb. 16, 1960          C. G. JOHN          2,925,261
AUTOMATIC CONVEYOR WEIGHER
Filed Feb. 11, 1958          8 Sheets-Sheet 7
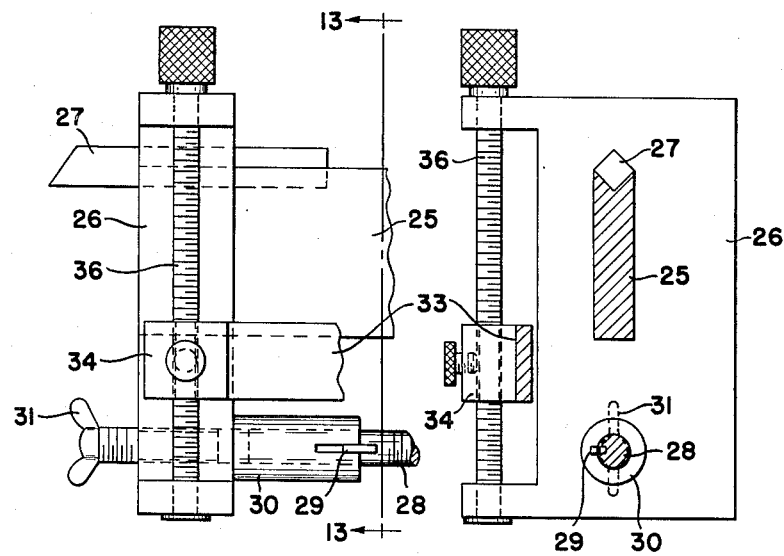
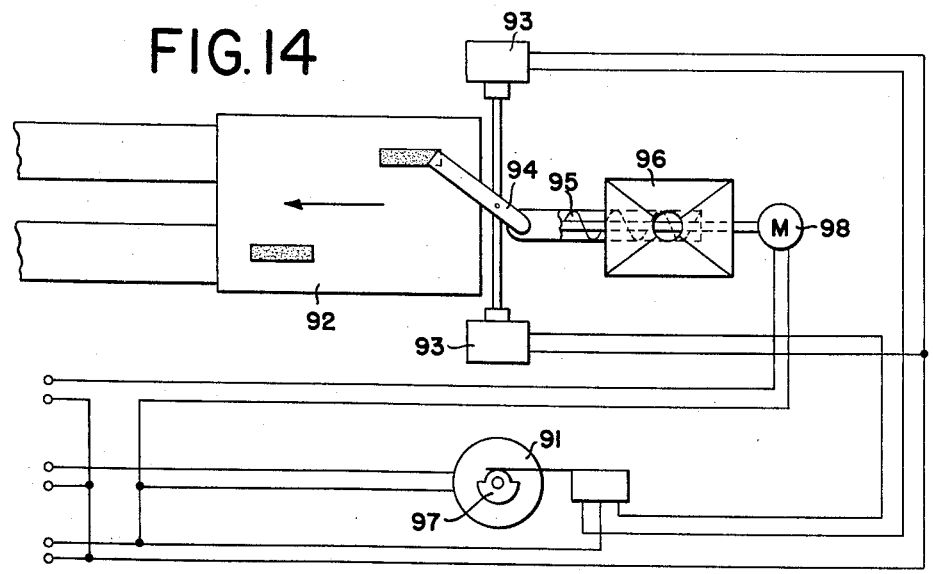
INVENTOR
CHAUCER G. JOHN
BY *James W. Ayler*
ATTORNEY

United States Patent Office 2,925,261
Patented Feb. 16, 1960

2,925,261

AUTOMATIC CONVEYOR WEIGHER

Chaucer G. John, South Miami, Fla.

Application February 11, 1958, Serial No. 714,512

10 Claims. (Cl. 265—56)

This invention relates broadly to weighing scales having an automatic counterpoise.

The purpose of this invention is to provide a basic mechanical weight-sensing unit that will activate standard commercial signaling instruments, and in commercial use, facilitate materials handling having any or all of the factors of continuous flow, time, weight, recording, blending, feeding, pricing, that are generally common to industry.

In many conventional weighing devices, the smaller the weight, the less amplitude of weight indication, and a similar lessening thereby of the area available for use of control equipment.

One objective of this invention is to avoid these handicaps and provide a device by which a minute weight will give an indication of large amplitude as well as that of a large weight. A further objective is to free the balance bar of all inhibiting influences such as the operation of dials, dampeners, and all devices taking their operating power from the swing of the balance bar.

The objectives of this invention are attached by the design of a scale balance bar or beam which, instead of extending at right angles to the line of the pivot points as in conventional scales is in a diagonal relationship to the line of pivot points. In the conventional balance, the counterpoise weight moves in a line at right angles to the line of pivots. This distance is a comparatively short distance for a heavy weight to record and a minute distance for a light weight. In my device, the diagonal balance bar along which the counterpoise weight moves has an adjustable diagonal relationship with the line of the pivot points such that one end of the balance beam can be measurable distance, variable at will, nearer the line of pivots than the other end. It is obvious that the counterpoise would have to travel the entire length of the balance beam to advance or recede this distance. It will be shown as this disclosure advances that by using this arrangement, which I believe to be novel, the purpose of this invention is accomplished.

A purpose of this device is to provide a means of recording the weight of material in a continuous flow over a conveyor belt and at the same time regulate the rate of flow of the material. The device also adapts itself to control related equipment to the weighing operation such as fillers, diverters, unit pricing equipment and signaling for time and weight cycles in process control problems.

In modern industries extremely close tolerances are required in most weighing and feeding operations. In many conventional scales and weighing devices, the smaller the weight, the less the amplitude of weight indication, and lessening thereby of the area available for use of control equipment.

To avoid handicap, there has been designed a weighing device that will indicate the minute weight with as much amplitude as a large weight.

There has been designed a scale balance to accomplish this whereby the balance bar, instead of being at right angles to the line of the pivot points, is in adjustable relationship to it in such a manner that the bar forms a diagonal line with the pivot points line. In this conventional balance, the counterpoise weight moves in a line at right angles to the pivots, which is a comparatively short distance for a heavy weight, and a minute distance for a small weight. In this device, the diagonal bar along which the counterpoise travels can be adjusted so that at the balance point the diagonal relationship is such that one end of the bar is a minute distance further away from the line of pivots than the other. It is obvious that the counterpoise would have to travel the entire length of the bar to advance this distance from the line of pivots. In this manner, which I claim is novel, I gain the amplitude of weight indication and increase in area for use of control equipment.

Other devices and instruments have been coordinated with the adjustable diagonal balance bar as a start or base, in the design of this device to achieve the objectives pointed out. These are: standard control mechanisms, motors, switches, rheostats, relays, servo mechanisms, hydraulic pumps and other commercial equipment.

To achieve speed and accuracy some novel means of control have been devised as follows:

The use of a variable speed electric impulse sender that carries weighing and control signals makes it feasible to block the signals occurring during the loading or impact period using only those in the gravity period. Coordinated with these impulses and controlled by their rate is the intermittent dampening and braking of the swing of the balance bar inherent in the action of a free moving balance bar. The stopping of the swing of the bar at closely spaced intervals prevents the development of momentum and allows the bar always to approach the balance point and not be carried beyond by the force of accumulated momentum. The positive action of the brake makes this possible. In actual practice the swing of the balance is limited to that segment of an arc represented by the effect of that weight chosen as "allowable tolerance."

Coupled with the impulse sender and brake, is a double pawl balance position senser that operates a toggle switch that reverses the mechanism moving the counterpoise. This mechanism consists of a segment of an arc generated from the pivot pin of the bar as a center and fixed rigidly to the bar. The pawls are placed with the free ends facing the limits of the arc tangent to the circumference of the arc and having a slight clearance with it. The pawls are held in this position by the cam operating the impulse sender. As the cam revolves the pawls are unsupported by that section of the cam cut away for this purpose and the pawls are pulled downward by spring action. Since the distance between the free edges of the pawls is the same as the base of the arc it is evident that if the arc moves in one direction it will allow the pawl it is moving away from to be pulled downward or toward the center point and will continue to rise and fall with the action of the cam until the arc moves in the other direction whereupon the other pawl acts in a like manner.

The downward movement of the pawls serves as the operating power for the toggle switch. Since the spacing between the ends of the pawls is adjustable with micrometer like exactness, it is possible to preset the reversing of the servo mechanism to that degree of swing of the balance bar caused by the action of a predetermined weight or allowed tolerance. The speed of the travel of the counterpoise is adjustable so that it coincides with the rhythmic cycle of the balance bar achieving a balance with a minimum of over-run and hunting.

A predetermined objective was to achieve a balance free of inhibiting influences, such as operation of dial mechanism, dampeners switches, and all devices taking their power from the balance swing. This has been achieved by the use of outside power to operate all controls and recording actions as set out above and is novel in that the balance is uninhibited in its seeking of the balance point and at the same time it determines the weighing and control cycle desired.

It is to be understood that not all weighing problems will require the use of all the devices to properly solve them and some will require additional setting up of equipment. The use of the diagonal bar coupled with the control elements associated with it, forms a basic unit capable of bringing about the realization of the purpose for which the device was designed.

Other objects and advantages of the invention, the method of assembly and operation of the component parts will be more clearly apparent by reference to the following description taken in connection with the accompanying drawings.

Figure 2:
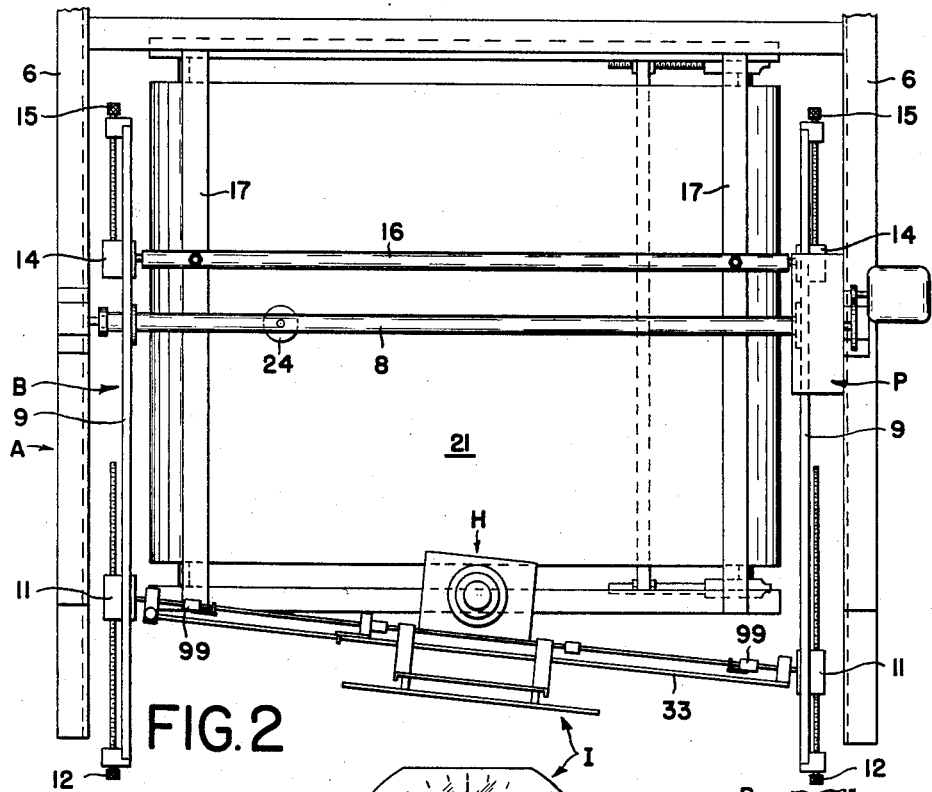
Figure 3:
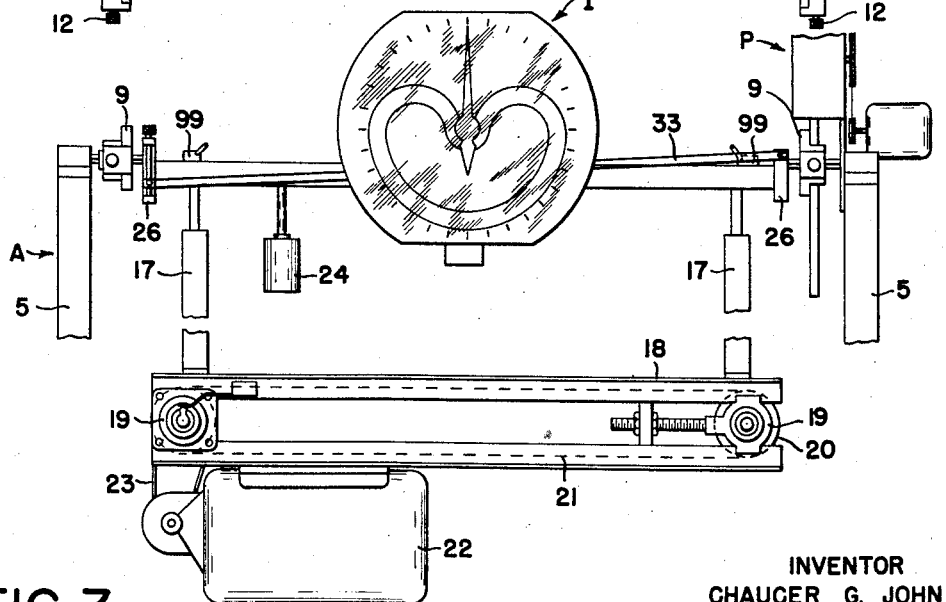
Figure 10:
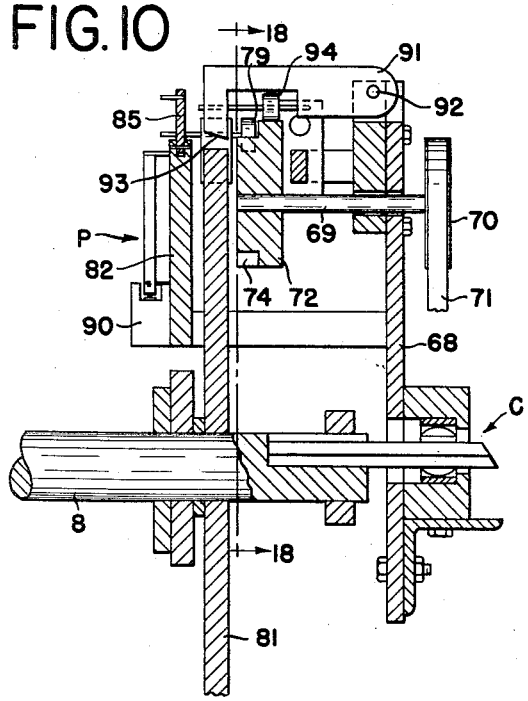
Figure 11:
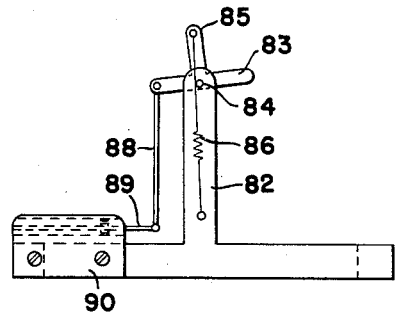
Figure 17:
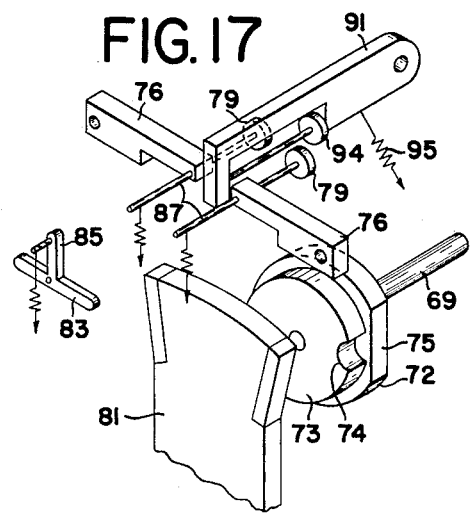
Figure 18:
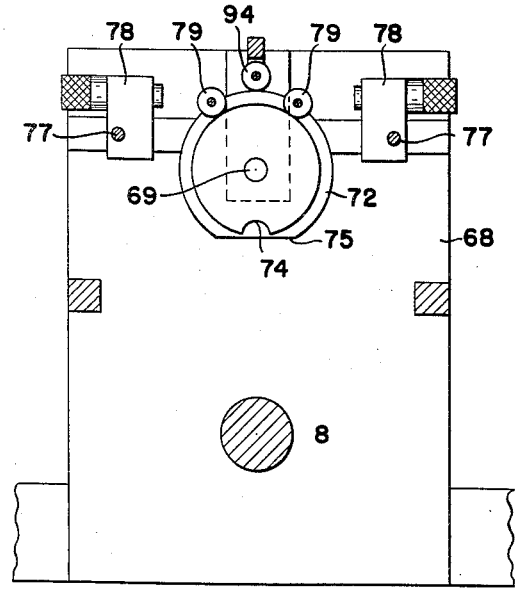
Figure 15:
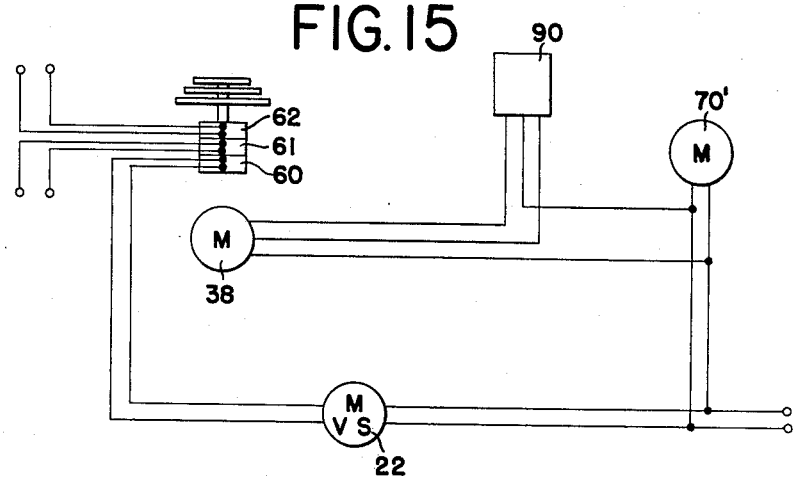
Figure 16:
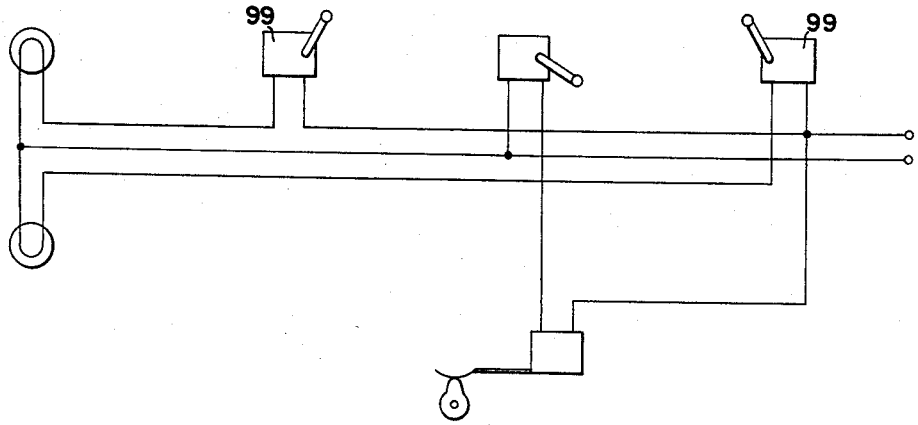

In the drawings:

Figure 1 is a perspective view of a device constructed in accordance with the invention, parts omitted and covered for sake of clearness, Figure 2 is a plan view of the device, Figure 3 is a side elevation thereof, Figure 4 is an end view thereof, Figure 5 is an enlarged fragmentary side elevation of a dial indicator and associated elements, Figure 6 is a plan view of the structure illustrated in Figure 5, Figure 7 is a transverse vertical section taken on line 7—7 of Figure 5, Figure 8 is a top plan view of a servo control unit and sensing mechanism for controlling the counterpoise, the cover thereof being removed, Figure 9 is a side elevation of the structure of Figure 8, taken substantially on line 9—9 of Figure 8, Figure 10 is a transverse vertical section taken substantially on line 10—10 of Figure 9, Figure 11 is a side elevation of a toggle assembly employed in connection with the sensing mechanism of Figure 8, Figure 12 is a fragmentary side elevation of a lost motion connection for feed screw embodied in the counterpoise mechanism, Figure 13 is a view taken substantially on line 13—13 of Figure 12, Figure 14 is a diagrammatic illustration showing a functional use of the device to maintain a constant flow of material and to divide it into equal and separate portions, Figure 15 is a wiring diagram for the operational control of the counterpoise and a driving motor for a materials conveyor associated with the device, Figure 16 is a wiring diagram for activating control instruments coordinated with the movement of the counterpoise, Figure 17 is an exploded view of sensing mechanism shown in Figure 9 and, Figure 18 is a section on line 18—18 of Figure 10.

Referring specifically to the drawings, the several component parts constituting the invention are indicated by capital letters. A suitable supporting frame, is indicated generally in Figures 2, 3 and 4 by the letter A. A generally H-section balance bar is indicated by the letter B. The main pivotal points to the frame are indicated generally at C. The suspension points for the conveyor platform is indicated by the letter D. The diagonal counterpoise support bar is indicated by the letter E. The adjustable pivot points for the diagonal counterpoise support bar are indicated by the letter F. The main counterpoise weight is indicated by the letter G. Servo mechanism for shifting the counterpoise is indicated by the letter H. Dial mechanism for visual reading is indicated by the letter I, see Figures 3, 5, 6 and 7. An incline bar for actuating dial mechanism is indicated generally by the letter J. A conveyor platform with variable speed drive is generally indicated by the letter L. Control mechanism for the servo mechanism of the counterpoise is indicated generally by the letter P, see Figures 8, 9 and 10. An adjustable pendulum weight for sensitising balance is indicated by the letter Q.

Referring now specifically to the drawings, see particularly Figures 2, 3 and 4, the numeral 5 designates a main supporting frame, here shown as being formed of angle irons and having a horizontal head rail 6. Journaled at its opposite ends in journal blocks 7 carried by the head rails, is a balance bar 8. The bearings are preferably of knife-blade type whereby a minimum of friction is encountered. Fixedly connected to the bar 8, is a pair of flat parallel beams 9. The beams 9 and the bar 8 constitute generally an H-frame. The beams 9 are slotted for their major length, as at 10 for the adjustable reception of blocks 11. The blocks 11 are adjustable by suitable micrometer screw adjustments 12 and whereby the blocks and mechanism to be presently described is adjustable toward and from the bar 8. The beams 9 are further slotted at their rear extremities, as at 13 for the adjustable reception of bearing blocks 14 having micrometer screw adjustments 15 and whereby to provide for a scale ratio adjustment. Journalled with respect to the blocks 14 is a second bar 16, constituting a suspension pivotal means for a pair of platform suspension brackets 17. The brackets 17 support the platform conveyor L, through the medium of side frame members 18, having journal bearings 19, that supports suitable rollers 20 carrying an endless belt 21. The belt is driven through the medium of a prime mover 22 suspended from a lower frame member of the structure and driving one roller 20 through the medium of suitable sprocket and sprocket chains 23, constituting a reduction drive for the belt. The prime mover 22 is controlled as to a variable speed drive, by mechanism to be presently recited. The bar 8 carries a counterweight 24, serving as a sensitising weight.

Connected to each of the blocks 11 is a diagonal scale beam 25. The beam 25 is angularly disposed with respect to the bar 8 and is adjustable at its opposite ends through the medium of the micrometer screws 12. Each end of the beam 25 is supported within blocks 26 and the blocks 26 in turn carry knife-blade bearing pins 27, that have their bearing in the blocks 11. The beam 25 is in horizontal alignment with the bar 8. Also connected with the blocks 26, is a feed screw 28. The screw 28 is held against rotation by a key 29 that is slottable in a slotted sleeve 30, adjustable with respect to one block 26, by an adjusting screw 31. The opposite end of the screw 28 has a wire shifting movement within a sleeve 32, carried by the opposite block 26. The purpose of the sleeves 30 and 32, is to provide for a lost motion action for the screw 28 when the mechanism is placed in action. The screw 28 is disposed somewhat below the beam 25 and parallel thereto. Adjustably connected to the blocks 26 is an incline rail 33. The rail 33 is pivotally connected to one block 26, at 34, while its opposite end has a pin and slot connection 35 with the opposite block 26 and with the rail being angularly adjustable in a vertical plane by an adjusting screw 36.

Adapted to traverse the beam 25 is the servo mechanism H for moving the counterpoise. The servo mechanism includes a frame 37 carrying a servo motor 38, having a drive shaft 39, driving a worm 40 which in turn drives a worm wheel 41, that has threaded engagement with the screw 28. The worm wheel 41, is held against longitudinal travel with respect to the frame 37 and as a result, when the motor 38 is energized, the servo mechanism will be shifted along the screw 28. The frame 37 traverses the beam 25 through the medium of slide bearings 42. Connected with the frame 37 as by bracket arms 43 is an indicator, including a dial face 44, a dial pointer 45 and a vernier scale indexed segment 46. The dial face and the indexed segment are graduated in any desirable manner in accordance with the particular use of the machine and the products to be weighed thereon. The pointer 45 and the segment 46 are fast upon a shaft 47, that is rotatable in a bearing head 48. The shaft 47 carries a pinion 49 that is in constant mesh with a rack bar 50. The rack bar has vertical guiding sliding movement in the head 48 and projects downwardly therebelow and carries a rearwardly extending pin 51, that overrides the rail 33 and, since the rail is vertically inclined, any movement of the servo mechanism along the scale beam 25 will cause a rise and fall of the bar 50, actuating the pointer and the segment in either direction. Any suitable adjustment for the dial assembly may be provided, such as adjustment screws 52 operating through the bracket arms 43 and having a threaded engagement with upstanding portions of the frame 37.

The frame 37 carries a horizontal platform 53, having suitable bearing and telescopic shafts 54, 55 and 56. The shafts at their upper ends carry grooved pulleys 57, 58 and 59. The shafts 54, 55 and 56 actuate rheostats 60, 61 and 62, for a purpose to be presently described. As clearly shown in Figure 1, the pulleys 57, 58 and 59 are progressively larger downwardly and these pulleys receive cables 63, 64 and 65 that are wrapped thereabout and with their opposite ends being anchored to the blocks 26, as at 67. Obviously, when the servo mechanism is actuated in a horizontal plane along the beam 25, the pulleys will be caused to rotate, varying the rheostats in accordance with the particular control necessary with respect to the speed of the conveyor 21. The motor 38 is actuated under the influence of a sensitising mechanism to be presently described, while the rheostats control the functions of the machine in operation.

Fixed with respect to one head rail 6 of the frame 5 is a sensitising control mechanism embodying a frame plate 68, bolted or otherwise connected to the rail 6. Journaled in a suitable bearing formed in the plate 68 is a shaft 69, carrying a groove pulley 70, that is driven from a suitable prime mover, such as an electric motor 70', through the medium of an endless belt 71. The motor is continuously driven during the actuation of the machine and constitutes the means for sensitising and actuating the motor 38 of the counterpoise mechanism to traverse the beam 25 in opposite directions. The shaft 69 fixedly carries a brake operating cam 72 and a concentric sensing latch operating cam 73. The cams are continuously rotated under the influence of the driven shaft 69. The cam 73 is provided with a notch 74, while the cam 72 is provided with one flat edge 75. Sensing latches 76 are pivotally connected upon studs 77 that are journalled in micrometer adjustment blocks 78, carried by the frame plate 68. Each of the latches carry latch rollers 79 that are adapted at predetermined positions of the beam to engage alternately within the notch 74. The latches 76 are biased toward the cam 73 by springs 80. Fixed to the adjacent bar 9 and centered with respect to the bar 8 is a segment plate 81. The upper end of the plate 81 is formed upon an arc and the arcuate end of the plate 81 underlies the latches 76. The latches 76 are notched upon their undersides, forming shoulders 82 and with the micrometer adjustments 78 spacing the shoulders an exact distance apart whereby the width of the spacing is normally the exact distance of the chord of the arc and the segment plate 81. The latches are tangent to the circumference of the arc of the plate 81 with clearance so that the arc may swing freely with the movement of the balance bar 9, with which it has a fixed relationship. In the balanced position, the ends of the chord of the arc and the shoulders formed by the notches in the latches, exactly coincide. When cam 73 revolves as it does when the device is operating, each latch is momentarily unsupported, as the notch 74 passes under its roller 79. This action allows the spring 80 to hold the latches in contact with the circumference of the cam 5 to normally depress the latches 76. The arc of the plate 81 has a swinging movement due to the balance action of the balance bar responding to varying loads upon the conveyor 21. Thus, the arc when swinging to the left will block the downward movement of the latch it passes under and, at the same time free the opposite latch 76 as it moves away from it, allowing it to be pulled downward momentarily by its respective tension spring 80.

An upstanding leg 82 carried by the frame 68 pivotally supports a rocker arm 83, as at 84. The rocker arm carries an upstanding leg portion 85 that is connected by a spring 86 to the leg 82 in such manner that the arm 83 may be alternately shifted to both right and left past center positions. The rocker arm 83 is actuated to its opposite past center positions by pins 87 that extend through the latches 76 and that also function as the shafts for the rollers 79 so that, when one latch is depressed into the recess 74 of the cam 73 under the influence of its spring 80, the rocker arm will be thrown to an opposite position and will remain in such position until the opposite latch has been released by the plate 82 to permit it to fall into the notch 73 of the cam in which position, the rocker arm is shifted to the opposite past center position. Connected to the rocker arm at one extremity is a link 88 that is connected to the tongue 89 of a single pole double-throw micro-switch 90. As the switch 90 is actuated, it energizes the motor 38 to cause the motor to rotate in a direction to shift the counterbalance mechanism in a direction to balance the device with respect to the weight upon the conveyor. This operation is continuous during the actuation of the machine and quickly senses the movement of the counterpoise mechanism back and forth to a point of accurate balance. The direction of flow of current to the motor 38 is thus caused to be changed with every swing of the plate 81 under the influence of the balance mechanism. Pivotally connected to the frame plate 68 to overlie and extend forwardly, is a brake arm 91, pivoted at 92 to rise and fall in a vertical plane. The arm 91 carries a brake head 93 that alternately engages the arcuate end of the plate 81. The brake 91 carries a roller 94 that engages the cam 72 and as the cam 72 rotates, the roller 94 alternately engages the flat surface 75, permitting the brake head 93 to be biased to braking contact with the arcuate end of the plate 81 under the influence of a suitable spring 95, thus dampening the swinging movement of the balance mechanism.

As illustrated in the diagram shown in Figure 15, it will be apparent, that the micro switch 90 is shown in assembled wired relationship to the counterpoise and the counterpoise motor 38. Thus, as the direction of current flow is reversed by the swinging of the balance bar, the motor 38 will be reversed alternately, causing the counterpoise to travel back and forth upon the balance bar 25 until the counterpoise has reached an accurate point of balance. This will be clear, as weight applied to the conveyor 21, causes the suspended platform and the balance bar to rock upon the pivots C, such rocking motion being imparted to the plate 81 which alternately actuates the latches 76, alternately tripping the switch 90. It in turn propels counterpoise H along the diagonal balance bar 25 in a direction determined by the circuitry of the switch and the motor. In practice, the counterpoise is moved toward the wide end of the diagonal balance bar 25 as it responds to a greater weight and as the diagonal balance bar 25 responds to a light weight. This is the normal directional movement of a counterpoise to bring a weight scale beam into the balance position. As shown in Figure 15, the lower rheostat 60 has been electrically connected to the variable speed motor 22 of the conveyor and the motor 22 will thus be governed in a speed in accordance with the demand for a greater or lesser weight upon the conveyor and is actuated in accordance with the movement of the counterpoise and through the variable control formed by the cable 63. The rheostats 61 and 62 may be suitably connected through electrical conductors to package feed control and to packaging filler control, all of which lies within the scope of the mechanism.

Figure 14 merely illustrates a functional use of the invention to maintain a constant flow of material and to divide it into equal and separate portions. In this diagram, there has been illustrated a variable speed gear head motor 91, a conveyor platform 92 corresponding to that illustrated in the seals mechanism. Coil plunger solenoids 93 are employed to shift a discharge spout 94 from side to side for depositing material in equal portions and spaced apart upon the conveyor. The spout leads from a conventional material feed screw 95, leading from a supply hopper 96. A switch 97 serves to alternately actuate the solenoids 93 for shifting the spout from side to side. A simple circuit has been illustrated as controlling these elements and the motor 91 may be controlled by the rheostat 61, while the motor 98 for the screw conveyor may be controlled by the rheostat 62 embodied in the counterpoise mechanism. Numerous controls may be employed for controlling various packaging machinery and the invention is not in any sense restricted to that structure extending beyond the scale mechanism, embodying the automatic counterpoise and the sensitising mechanism hereinbefore described in detail.

As in Figure 16, limit switches 99 may be employed upon the diagonal balance bar as a safety means to prevent the overrun of the counterpoise mechanism in either direction and any suitable visual or audible alarm devices may be employed as becomes necessary.

In view of the foregoing it is believed, that the operation of the basic principle of the device will be clearly apparent. When the scale is to be placed in operation, the motor 70' is energized, causing the cams 72 and 73 to rotate. The rotation of the cams will actuate the latches 76 alternately to energize the motor 38 to actuate the counterpoise in a direction to bring the scale into balance at which time the counterpoise remains stationary with the meter alternating within the limits of the backlash provided by the lost motion mechanism of lead screw 28 shown in Figure 12. When the weight tilts the scale in one direction, the arcuate plate 81 permits the latch 76 to drop downwardly as the notch 73 comes into registry with its roller, actuating the switch 90 and energizing the motor 38 to cause the counterpoise to traverse the beam 25 to a point where the counterpoise has reached a point of balance with respect to the load upon the conveyor. As the weight varies upon the conveyor, the counterpoise is caused to travel back and fourth through the sensitising mechanism until a new balance has been established and as the counterpoise travels along the bar 25, the pointer and the segments 45 and 46 are shifted along the incline bar 33. The device appears to be novel in construction, is rapid in operation and permits of a quick automatic balance within a minimum travel of the counterpoise mechanism. The stopping of the swing of the balance bar at closely spaced intervals prevents the development of momentum and allows the bar always to reach the balance point and not be carried beyond by the force of accumulated momentum. The positive action of the brake 91 makes this possible. In actual practice the swing of the balance is limited to that segment of an arc represented by the effect of that weight as that chosen as allowable tolerance. As clearly pointed out, counterpoise group H will move away from a selected balance point on the bar 25 in one direction if weight is added, and in the other if weight is subtracted from the platform 21. It will stop at a new balance point until a change of weight is made upon the platform 21 whereupon it automatically seeks a new balance point. Basically, the objectives of this invention, as before pointed out are attained by the design of a scale balance bar or beam which, instead of extending at right angles to the line of the pivot points as in conventional scales, is in a diagonal relationship to the line of pivot points. The diagonal balance bar along which the counterpoise weight moves has an adjustable diagonal relationship with the line of the pivot points such that one end of the balance beam can be a measurable distance, variable at will, nearer the line of pivots than the other end. It is obvious that the counterpoise would have to travel the entire length of the balance beam to advance or recede this distance. It will be seen from the foregoing disclosure that by using this arrangement, which is believed to be novel, the probable purpose of this invention is accomplished.

It is to be understood that the invention is not limited to the precise construction shown, but that changes are contemplated as readily fall within the spirit of the invention as shall be determined by the scope of the subjoined claims.

Having described my invention, what I claim as new and desire to secure by Letters Patent is:

1. Mechanism of the character described comprising a supporting structure, a balance bar, a pair of parallel spaced beams carried by said bar, the beams being disposed at a right angle to the balance bar, a counterpoise bar extending between said beams and having its ends supported from said beams, said counterpoise bar lying at an obtuse angle with respect to said balance bar, a counterpoise mounted to travel endwise upon the counterpoise bar, a structure for material to be weighed, means for connecting said last named structure to the beams at that side of the balance bar opposite to the counterpoise bar, and means operable under variations of the weight of the material being weighed for shifting the counterpoise back and forth upon the counterpoise bar until a position of balance is reached.

2. A structure as recited in claim 1 in combination with adjustable means connecting the ends of the counterpoise bar to the beams constructed to vary the angle of the counterpoise bar with respect to the balance bar.

3. A structure as recited in claim 1 in combination with adjustable means connecting the ends of the counterpoise bar to the beams constructed to vary the angle of the counterpoise bar with respect to the balance bar, said adjustable means comprising blocks slidable endwise of said beams and portions carried at the ends of the counterpoise bar having engagement with said blocks.

4. A weighing mechanism comprising a pair of spaced beams lying in substantial parallelism with each other, means for pivoting said beams upon a common axis adjacent their inner ends, a balance bar connected to the beams rearwardly of the common axis and parallel to the common axis, a weight supporting structure connected to said balance bar inwardly of said beams, a counterpoise bar lying at an obtuse angle with respect to said common axis of the pivot point of the beams and being disposed toward the outer ends of the beams, and a counterpoise slidable endwise upon the counterpoise bar.

5. A structure as recited in claim 4 in combination with means for propelling the counterpoise endwise of the counterpoise bar and means for actuating said propelling means under control of the weight supporting structure.

6. A structure as recited in claim 4 in combination with means for adjusting the point of connection of the weight supporting structure to the beams toward and from said common axis.

7. A structure as recited in claim 1 wherein the supporting structure for the material to be weighed includes a traveling conveyor.

8. A structure as recited in claim 1 wherein the balance bar and the counterpoise bar lie in substantially the same horizontal plane.

9. A weighing device of the character described that comprises a balance bar and a pivot bar that are parallel, a supporting structure for the pivot bar, parallel spaced apart beams that are connected to the pivot bar to extend at a right angle thereto and to project forwardly and rearwardly of the pivot bar, the balance bar being rearwardly of the pivot bar and having pivotal connection with the beams, supporting means for material to be weighed connected to the balance bar, a counterpoise bar that has adjustable diagonal relationship to the axis of the pivot points of the balance bar, a counterpoise adapted to traverse the counterpoise bar and means actuatable by the support for the material to be weighed for moving the counterpoise along the counterpoise bar for bringing the counterpoise into a balanced relationship with the material being weighed.

10. A weighing device of the character described comprising a balance bar, the balance bar being axially pivotally supported, supporting means for material to be weighed that is suspended from the balance bar, a counterpoise bar that is adjustably supported with respect to the balance bar and progressively extended away from the axis of the balance bar, a counterpoise adapted to traverse the counterpoise bar and means actuatable by the support for the material to be weighed for moving the counterpoise along the counterpoise bar for bringing the counterpoise into a balance relationship with the material being weighed.

References Cited in the file of this patent
UNITED STATES PATENTS

| | | |
|---|---|---|
| 440,579 | Skinner | Nov. 11, 1890 |
| 2,633,349 | Williams | Mar. 31, 1953 |